United States Patent
Kitagawa et al.

(10) Patent No.: US 10,589,446 B2
(45) Date of Patent: Mar. 17, 2020

(54) WIRE SAW APPARATUS

(71) Applicant: SHIN-ETSU HANDOTAI CO., LTD., Tokyo (JP)

(72) Inventors: Koji Kitagawa, Nishigo-mura (JP); Yuichi Shimizu, Nishigo-mura (JP)

(73) Assignee: SHIN-ETSU HANDOTAI CO., LTD., Tokyo (JP)

( * ) Notice: Subject to any disclaimer, the term of this patent is extended or adjusted under 35 U.S.C. 154(b) by 0 days.

(21) Appl. No.: 15/558,833

(22) PCT Filed: Mar. 3, 2016

(86) PCT No.: PCT/JP2016/001146
§ 371 (c)(1),
(2) Date: Sep. 15, 2017

(87) PCT Pub. No.: WO2016/178297
PCT Pub. Date: Nov. 10, 2016

(65) Prior Publication Data
US 2018/0079108 A1    Mar. 22, 2018

(30) Foreign Application Priority Data
May 1, 2015    (JP) ................. 2015-094358

(51) Int. Cl.
*B28D 5/00*    (2006.01)
*B24B 27/06*    (2006.01)
(Continued)

(52) U.S. Cl.
CPC ............ *B28D 5/0076* (2013.01); *B24B 27/06* (2013.01); *B24B 27/0633* (2013.01);
(Continued)

(58) Field of Classification Search
CPC ....... B24B 27/063; B24B 55/02; B24B 57/02; B28D 5/0076
(Continued)

(56) References Cited
U.S. PATENT DOCUMENTS 2,899,781 A * 8/1959 Williams ................ B24B 55/02
                                                    204/224 M
3,148,488 A * 9/1964 Reaser .................. B24B 55/045
                                                    451/450
(Continued)

FOREIGN PATENT DOCUMENTS

JP    H11-48119 A    2/1999
JP    2000-153460 A    6/2000
(Continued)

OTHER PUBLICATIONS

Aug. 31, 2018 Office Action issued in Chinese Patent Application No. 201680016080.7.
(Continued)

*Primary Examiner* — Timothy V Eley
*Assistant Examiner* — Marcel T Dion
(74) *Attorney, Agent, or Firm* — Oliff PLC

(57) ABSTRACT

A wire saw apparatus including: a wire row formed of a wire wound around a plurality of wire guides and reciprocatively travels in an axial direction; a nozzle from a coolant or slurry is supplied to the wire; and a workpiece feed mechanism presses a held workpiece against the wire row, the wire saw apparatus slice the workpiece into a wafer shape by pressing the workpiece held by the workpiece feed mechanism against the wire row and feeding it for slicing while supplying the coolant or the slurry from the nozzle to the wire, the wire saw apparatus nozzle is arranged above the wire row to be orthogonal to the wire row, and windbreak plates
(Continued)

are arranged on both left and right sides of the arranged nozzle seen from an axial direction.

2 Claims, 2 Drawing Sheets

(51) Int. Cl.
    *B24B 57/02* (2006.01)
    *B24B 55/02* (2006.01)
    *B28D 5/04* (2006.01)

(52) U.S. Cl.
    CPC .............. *B24B 55/02* (2013.01); *B24B 57/02* (2013.01); *B28D 5/007* (2013.01); *B28D 5/042* (2013.01); *Y02P 70/179* (2015.11)

(58) Field of Classification Search
    USPC .................. 451/168, 450, 53; 125/21, 16.02
    See application file for complete search history.

(56) References Cited

U.S. PATENT DOCUMENTS

| | | | | |
|---|---|---|---|---|
| 3,325,949 | A * | 6/1967 | Fisher | B24B 55/02 451/450 |
| 3,568,377 | A * | 3/1971 | Blohm | B24B 55/02 451/444 |
| 5,709,593 | A * | 1/1998 | Guthrie | B24B 57/02 451/287 |
| 6,381,830 | B1 * | 5/2002 | Chikuba | B22F 5/003 125/16.02 |
| 6,468,134 | B1 * | 10/2002 | Gotkis | B24B 21/04 451/306 |
| 2006/0025051 | A1 | 2/2006 | Noguchi et al. | |
| 2008/0070488 | A1 * | 3/2008 | Fujita | B24B 37/04 451/444 |
| 2010/0206285 | A1 * | 8/2010 | Kitagawa | B24B 27/0633 125/16.02 |
| 2012/0006312 | A1 * | 1/2012 | Grumbine | B28D 5/0076 125/21 |
| 2013/0327308 | A1 * | 12/2013 | Jeon | B28D 5/007 125/21 |
| 2015/0314484 | A1 * | 11/2015 | Pietsch | B23D 57/0023 125/21 |

FOREIGN PATENT DOCUMENTS

| | | |
|---|---|---|
| JP | 2004-195555 A | 7/2004 |
| JP | 2006-35402 A | 2/2006 |
| JP | 2009-113173 A | 5/2009 |
| JP | 2010-23208 A | 2/2010 |
| JP | 2012-179712 A | 9/2012 |
| JP | 2013-010152 A | 1/2013 |

OTHER PUBLICATIONS

Apr. 5, 2016 Search Report issued in International Patent Application No. PCT/JP2016/001146.
Nov. 7, 2017 International Preliminary Report on Patentability issued in International Patent Application No. PCT/JP2018/001146.
Oct. 3, 2017 Office Action issued in Japanese Patent Application No. 2015-094358.
Jul. 16, 2019 Office Action issued in Taiwanese Patent Application No. 105106853.

* cited by examiner

WIRE SAW APPARATUS

TECHNICAL FIELD

The present invention relates to a wire saw apparatus.

BACKGROUND ART

As means for slicing off a wafer from a semiconductor ingot, a wire saw has been conventionally known. In the wire saw apparatus, a slicing wire is wound around a plurality of wire guides many times to form a wire row, the slicing wire is driven in an axial direction at a high speed, a workpiece is fed to the wire row for cutting while appropriately supplying slurry containing free abrasive grains of silicon carbide or the like, and this workpiece is thereby sliced to respective wire position at the same time.

In more detail, a slice base extending over an entire region along the axial direction is secured to a part of the workpiece in a circumferential direction, the entire workpiece is fed for slicing in a state where this slice base is held in a workpiece holder, and it is sliced by the cutting wire from a side opposite to the slice base. At this time, as to a direction along which the workpiece is pressed against the wire row, a method for pressing the workpiece against the wire row from above and a method for pressing the same from below are known, but a method for pressing the workpiece against the wire row from above is the mainstream in slicing of a semiconductor silicon ingot.

Further, there is also recently adopted a method for performing slicing while supplying a coolant only with the use of a wire having diamond abrasive grains fixed on a wire surface thereof in place of supplying slurry containing free abrasive grains. The method for supplying the slurry containing free abrasive grains will be referred to as a free abrasive grain system, and the method using the wire having diamond abrasive grains fixed on the wire surface thereof will be referred to as a fixed abrasive grain system hereinafter.

Here, FIG. 3 shows an overview of a general wire saw apparatus.

A wire saw apparatus 101 includes a wire 103 to slice a workpiece 102, at plurality of wire guides 104 around which the wire 103 is wound, a wire tension applying mechanisms 105 and 105a to apply tensile force to the wire 103, a workpiece feed mechanism 106 which holds the workpiece 102 to be sliced and feeds it downward, and a nozzle 107 which supplies a coolant or slurry at the time of slicing.

A working fluid supply mechanism 108 is constituted of the nozzle 107, a tank 109, a chiller 110, and others. The nozzle 107 is installed above a wire row 103a to be orthogonal to the wire row 103a. The nozzle 107 is connected to the tank 109, and the coolant or the slurry can be stirred in the tank 109, subjected to temperature control by the chiller 110, and then supplied from the nozzle 107 to the wire 103.

The coolant or the slurry is supplied in a curtain-like manner through a slit with a fixed width provided in a lower surface of the nozzle 107 so that it can be uniformly supplied to each wire 103 in the wire row 103a. Further, the coolant or the slurry is fed to a slicing portion of the workpiece 102 through the wire row 103a. Then, the supplied coolant or slurry is returned to the tank 109 and recycled.

The wire 103 is reeled out from one wire reel 111, fed to the wire tension applying mechanism 105 formed of a torque motor 113 or the like via a traverser 112, and reaches the wire guides 104. The wire 103 is wound around the wire guides 104 for approximately 300 to 400 times so that it travels in an axial direction to form the wire row 103a, and is then taken up by a wire reel 111a through the other wire tension applying mechanism 105a including a torque motor 113a and a traverser 112a.

When the workpiece 102 is sliced into a wafer shape by using such a wire saw apparatus 101 and a shape of the sliced wafer is checked, a large warp is produced in some situations. The warp is one of important qualities in slicing of the semiconductor wafer, and a further reduction is demanded as a request for product, quality is increased.

It has been revealed that, of warps produced due to slicing of the workpiece 102, one which is produced in a latter half part of slicing is greatly affected by scattering of the supplied slurry. Thus, a measure has been taken to reduce an influence of spatter of the scattered slurry by taking a large distance between a lower end surface of a workpiece holding section and an upper surface of a workpiece as disclosed in Patent Literature 1, or to reduce the influence by controlling a scattering direction of the slurry as disclosed in Patent Literature 2 and Patent Literature 3.

CITATION LIST

Patent Literatures

Patent Literature 1: Japanese Unexamined Patent Application No. 2010-23208
Patent Literature 2: Japanese Unexamined Patent Application No. 2009-113173
Patent Literature 3: Japanese Unexamined Patent Application No. 2012-179712

SUMMARY OF INVENTION

Technical Problem

However, when the request, for the product quality is increased more than ever, an improvement in warp is not sufficient. In particular, the improvement in warp shape is not sufficient just before end of slicing of a workpiece, i.e., in a portion close to an outer periphery of the wafer which becomes a product.

Since the warp produced in the latter half part of slicing of the workpiece is greatly affected by a state that the slurry supplied onto the wire impacts a side surface of the workpiece and scatters, decreasing an amount of the slurry to be supplied enables reducing a scattering amount.

At this time, since the workpiece has a cylindrical shape and a slicing length (a length for which the wire is in contact with the workpiece) in the latter half part of slicing of the workpiece is shorter than that in a central portion of the workpiece, an amount of the slurry required for slicing is smaller than that in the workpiece central portion, and the amount of the scattering slurry can be reduced without degrading a slicing ability even if a supply amount of the slurry is decreased to be smaller than that in the workpiece central portion in the latter half part of slicing of the workpiece.

However, when the supply amount of the slurry is deceased so that the amount of scattering slurry becomes small, there occurs a problem of degradation of longitudinal uniformity of a slurry curtain which is supplied in a curtain-like manner from the nozzle installed above the wire row to be substantially orthogonal to the wire row through the slit with a fixed width provided in the lower surface of the nozzle.

That is, when the slurry is supplied at a given constant flow rate or more, the slurry curtain is stable, but reducing the flow rate of the slurry to be supplied leads to a problem of occurrence of a phenomenon that the slurry curtain swings in a direction vertical to the longitudinal direction or the slurry curtain is disconnected in a part along the longitudinal direction.

That is because, when the wire row travels at a high speed or the wire guides rotate at a high speed due to traveling of the wire row at a high speed, a wind pressure is produced, and the slurry curtain is thereby blown off. When a state of the slurry curtain becomes unstable and the uniformity of the supply amount of the slurry to the wire row becomes poor, a warp of the sliced wafer is considerably degraded, which must be assuredly avoided.

In view of the problem, it is an object of the present invention to provide a wire saw apparatus which can uniformly supply a coolant or slurry to a wire row even if a flow rate of the coolant or the slurry is reduced.

Solution to Problem

To achieve the object, according to the present invention, there is provided a wire saw apparatus including: a wire row formed of a wire which is wound around a plurality of wire guides and reciprocatively travels in an axial direction; a nozzle from which a coolant or slurry is supplied to the wire; and a workpiece feed mechanism which presses a held workpiece against the wire row, the wire saw apparatus being configured to slice the workpiece into a wafer shape by pressing the workpiece held by the workpiece feed mechanism against the wire row and feeding it for slicing while supplying the coolant or the slurry from the nozzle to the wire, the wire saw apparatus being characterized in that the nozzle is arranged above the wire row to be orthogonal to the wire row, and windbreak plates are arranged on both left and right sides of the arranged nozzle seen from an axial direction.

With such a structure, since the wind pressure produced by traveling of the wire row or rotation of the wire guides can be blocked by the windbreak plates, even if a flow rate of the coolant or the slurry is reduced, the coolant or the slurry can be uniformly supplied to the wire row. Consequently, the coolant or the slurry can be prevented from being swung or blown off by the wind pressure, degradation of a warp can be avoided. Additionally, since the flow rate of the coolant or the slurry in a slicing end portion of the workpiece can be reduced to be smaller than a flow rate of the coolant or the slurry in a central portion of the workpiece, the warp in the slicing end portion of the workpiece can be improved.

Further, at this time, it is preferable for each windbreak plate to be arranged in such a manner that a distance from a center of a slit provided in a lower surface of the nozzle becomes 5 mm or more and 40 mm or less.

With such a structure, since the wind pressure produced due to traveling of the wire row or rotation of the wire guides can be further assuredly blocked by the windbreak plates while preventing the windbreak plate from coming into contact with the curtain-like coolant or slurry, even if the flow rate of the coolant or the slurry is reduced, the coolant or the slurry can be further securely uniformly suppled to the wire row.

Furthermore, at this time, it is preferable for each windbreak plate to be arranged in such a manner that a distance between a lower surface of the windbreak plate and the wire row becomes 1 mm or more and 10 mm or less.

With such a structure, since a film of the coolant or the slurry on the wire row can be prevented from being scraped off by the lower surface of the windbreak plate, degradation of slicing quality of the workpiece can be avoided. Moreover, since the wind pressure produced due to traveling of the wire row or rotation of the wire guides can be more assuredly blocked by each windbreak plate, even if the flow rate of the coolant or the slurry is reduced, the coolant, or the slurry can be further securely uniformly supplied to the wire row.

Advantageous Effects of Invention

According to the wire saw apparatus of the present invention, since the wind pressure produced due to traveling of the wire row or rotation of the wire guides can be blocked by the windbreak plates, even if the flow rate of the coolant or the slurry is reduced, the coolant or the slurry can be uniformly supplied to the wire row. Consequently, the coolant or the slurry can be prevented from being swung or blown off due to the wind pressure, and hence degradation of a warp can be avoided. Additionally, the flow rate of the coolant or the slurry in the slicing end portion of the workpiece can be reduced to be smaller than the flow rate of the coolant or the slurry in the central portion of the workpiece, and hence a warp in the slicing end portion of the workpiece can be improved.

DESCRIPTION OF EMBODIMENTS

Although an embodiment of the present invention will be now described hereinafter, the present invention is not restricted thereto.

As described above, when a flow rate of slurry to be supplied is reduced, there arises a problem of occurrence of a phenomenon that a slurry curtain swings in a direction vertical to a longitudinal direction or the slurry curtain is disconnected in a part of the longitudinal direction.

Thus, the present inventors have repeatedly conducted the earnest examinations to solve such a problem. Consequently, they have found out that, when windbreak plates are arranged on both left and right sides of a nozzle, from which a coolant or slurry is supplied, seen from a longitudinal direction, since a wind pressure produced due to traveling of a wire row or rotation of wire guides can be blocked by the windbreak plates, even if a flow rate of the coolant or the slurry is reduced, the coolant or the slurry can be uniformly supplied to the wire row. Further, they have carefully examined the best mode to carry out this structure, thereby bringing the present invention to completion.

Figure 1:
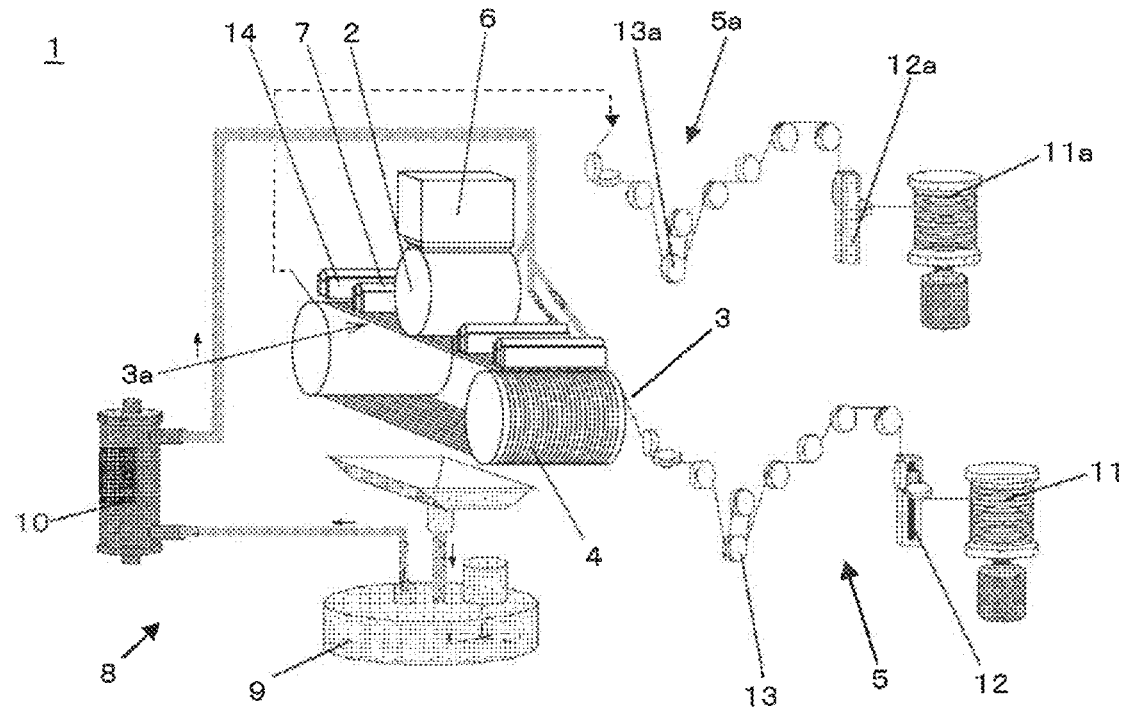
FIG. 1 is a schematic view showing an example of a wire saw apparatus according to the present invention.

As shown in FIG. 1, a wire saw apparatus 1 according to the present invention includes a wire 3 to slice a workpiece 2, a plurality of wire guides 4 around which the wire 3 is wound, wire tension applying mechanisms 5 and 5a to apply tensile force to the wire 3, a workpiece feed mechanism 6 which holds the workpiece 2 to be sliced and presses the held workpiece 2 against a wire row 3a to feed it for slicing so that the workpiece 2 can be sliced into a wafer shape, and nozzles 7 from which a coolant or slurry is supplied at the time of slicing the workpiece 2.

A working fluid supply mechanism 8 is constituted of the nozzles 7, a tank 9, a chiller 10, and the like. The nozzles 7 are installed above the wire row 3a to be orthogonal to the wire row 3a. The nozzles 7 are connected to the tank 9, the coolant or the slurry can be stirred in the tank 9, subjected to temperature control by the chiller 10, and then supplied to the wire 3 from the nozzles 7.

Figure 2:
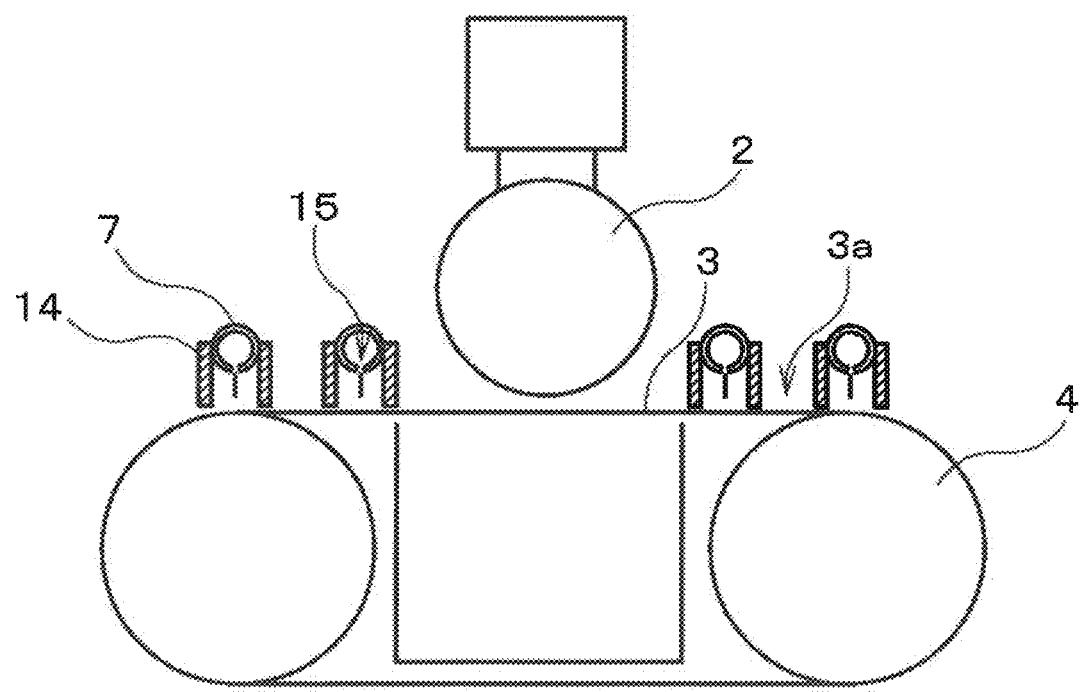
FIG. 2 is a schematic view showing an example of windbreak plates arranged in the wire saw apparatus according to the present invention.
Figure 3:
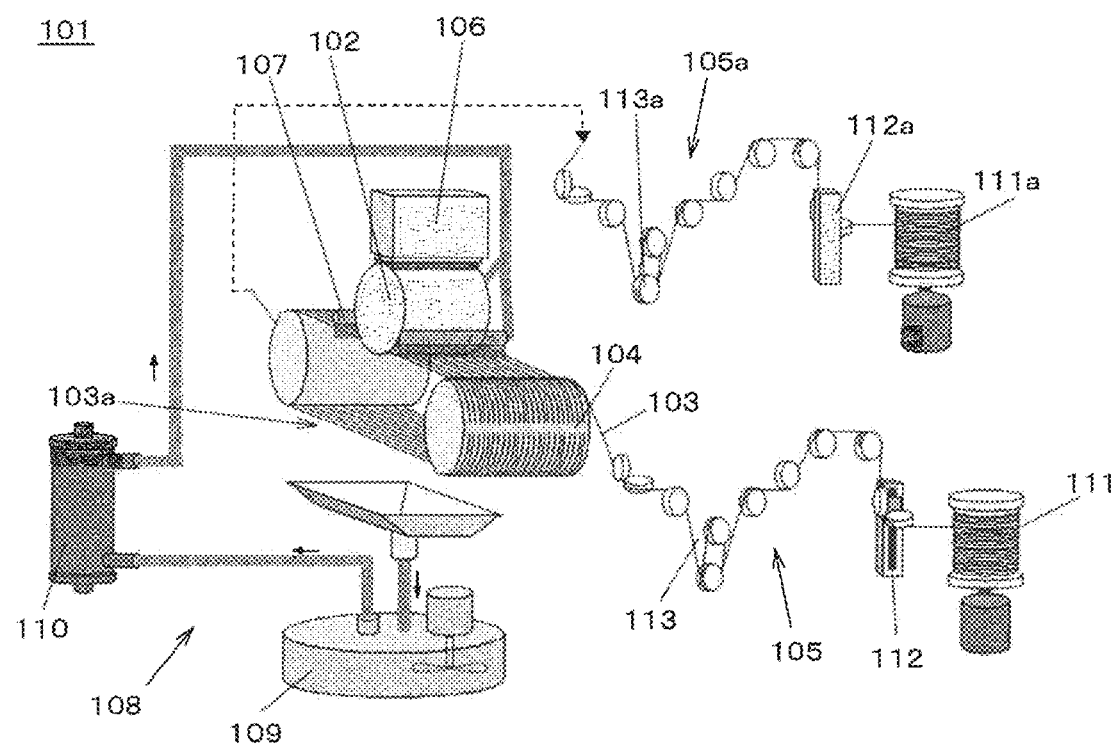
FIG. 3 is a schematic view showing a general wire saw apparatus according to a conventional example.

To uniformly supply the slurry or the coolant to each wire 3 in the wire row 3a, as shown in FIG. 2, the slurry or the coolant is supplied in a curtain-like manner through a slit 15 with a fixed width provided in a lower surface of each nozzle 7. Furthermore, the coolant or the slurry is fed to a slicing portion of the workpiece 2 through the wire row 3a. Then, the supplied coolant or slurry returns to the tank 9 and recycled.

The wire 3 is reeled out from one wire reel 11, fed to the wire tension applying mechanism 5 formed of a torque motor 13, a dancer roller (a deadweight) (not shown), or the like via a traverser 12, and reaches the wire guides 4. The wire 3 is wound around the wire guides 4 for approximately 300 to 400 times so that it travels in an axial direction to form the wire row 3a, and is then taken up by a wire reel 11a through the other wire tension applying mechanism 5a including a torque motor 13a and a traverser 12a.

It is to be noted that the present invention can be preferably applied to both the free abrasive grain system and the fixed abrasive grain system.

Furthermore, as shown in FIG. 1 and FIG. 2, the windbreak plates 14 are arranged on both left and right sides of each of the nozzles 7, which are arranged above the wire row 3a to be orthogonal to the wire row 3a, seen from an axial direction in the wire saw apparatus 1 according to the present invention.

According to such a structure, since a wind pressure produced due to traveling of the wire row 3a or rotation of the wire guides 4 can be blocked by the windbreak plates 14, even if a flow rate of the coolant or the slurry is reduced, the coolant, or the slurry can be uniformly supplied to the wire row 3a. Consequently, since the coolant or the slurry can be prevented from being swung or blown off by the wind pressure, degradation of a warp can be avoided. Moreover, since a flow rate of the coolant or the slurry in a slicing end portion of the workpiece 2 can be decreased to fall below a flow rate of the coolant or the slurry in a central portion of the workpiece 2, a warp in the slicing end portion of the workpiece 2 can be improved.

A shape of the windbreak plate 14 can be any shape as long as it can separate the curtain-like coolant or slurry and a peripheral space from each other and prevent the coolant or the slurry from being swung or blown off by the wind pressure. For example, tabular members each having such a cross-sectional shape as shown in FIG. 2 can be arranged on both the left and right sides of each nozzle 7 seen from the axial direction, respectively. It is to be noted that the tabular member of the windbreak plate 14 is preferably made of stainless steel.

In FIG. 2, the two nozzles 7 are arranged on each of the left and right sides seen from a slicing surface direction of the workpiece 2. Further, the windbreak plates 14 are arranged relative to all the four nozzles 7. As regards all the nozzles 7, the windbreak plates 14 can block the wind pressure produced due to traveling of the wire row 3a or rotation of the wire guides 4, which is preferable.

However, the present invention is not restricted thereto, and the windbreak plates 14 may be arranged to each single nozzle 7 close to the workpiece 7 on each of the left and right sides seen from the slicing surface direction of the workpiece 2. With such an arrangement, as regards at least each single nozzle 7 close to the workpiece 2 on each of the left and right sides seen from the slicing surface direction of the workpiece 2, the coolant or the slurry can be uniformly supplied to the wire row 3a, and hence degradation of a warp can be sufficiently avoided. Furthermore, the number of the nozzle 7 may be one on each of the left and right sides seen from the slicing surface direction of the workpiece 2, or more nozzles 7 may be installed.

Moreover, at this time, it is preferable for each windbreak plate 14 to be arranged in such a manner that a distance from the center of a slit 15 provided in a lower surface of the nozzle 7 becomes 5 mm or more and 40 mm or less.

With such a configuration, since the windbreak plates 14 can assuredly block the wind pressure produced due to traveling of the wire row 3a or rotation of the wire guides 4 while avoiding contact with the curtain-like coolant or slurry by the windbreak plate 14, even if a flow rate of the coolant or the slurry is reduced, the coolant or the slurry can be more securely uniformly supplied to the wire row 3a.

Additionally, at this time, it is preferable for each windbreak plate 14 to be arranged in such a manner that a distance between a lower surface of the windbreak plate 14 and the wire row 3a becomes 1 mm or more and 10 mm or less.

With such an arrangement, since a film of the coolant or the slurry on the wire row 3a can be prevented from being scraped off by the lower surface of each windbreak plate 14, degradation of slicing quality of the workpiece 2 can be avoided. Further, since the windbreak plates 14 can assuredly block the wind pressure produced due to traveling of the wire row 3a or rotation of the wire guides 4, even if the flow rate of the coolant or the slurry is reduced, the coolant or the slurry can be more securely uniformly supplied to the wire row 3a.

It is to be noted that, in the present invention, the windbreak plates 14 are particularly effective when the flow rate of the coolant or the slurry is small, but they can be also applied when the flow rate of the coolant or the slurry is not reduced as a matter of course.

EXAMPLES

The present invention will now be more specifically described hereinafter with reference to an example and a comparative example of the present invention, but the present invention is not restricted thereto.

Example

A workpiece 2 was sliced by using such a wire saw apparatus 1 of the present invention as shown in FIG. 1 in which windbreak plates 14 each having such a cross-sectional shape as shown in FIG. 2 were arranged. As the windbreak plates 14, stainless steel plates were used.

As shown in FIG. 1, the wire saw apparatus 1 having two nozzles 7 arranged on each of left and right sides seen from a slicing surface direction of the workpiece 2 was used. Further, as shown in FIG. 2, the windbreak plates 14 were arranged on both left and right sides of each of the four arranged nozzles 7 seen from an axial direction of the nozzles 7.

A slit 15 was provided in a lower surface of each nozzle 7, and a width of the slit 15 was set to 2 mm. Furthermore, each tabular windbreak plate 14 having a board thickness of 1 mm was arranged in such a manner that a distance from a center of the slit 15 of the nozzle 7 was 20 mm and a distance between a lower surface of the windbreak plate 14 and a wire row 3a was 5 mm.

The workpiece 2 to be sliced was a silicon ingot having a diameter of 300 mm and a length of 150 mm. As a wire 3, a wire having a diameter of 0.14 mm was used, and tensile force to be given to the wire 3 by wire tension applying mechanisms 5 and 5a was set to 25 N. A traveling speed of the wire 3 was set to 700 m/min.

Slurry was made of abrasive grains of silicon carbide (GC #1500) and a glycol based coolant, abrasive grain density was set to 50%, and a temperature was set to 23° C.

Moreover, as flow rate conditions of the slurry, a flow rate of the slurry from start of slicing to the center of the workpiece 2 was set to 25 L/min for each nozzle. Additionally, the flow rate of the slurry was linearly decreased like forming a straight line from the center of the workpiece 2 to a slicing end portion of the same so that the flow rate in the slicing end portion could have each of amounts shown in the following Table 1. As shown in Table 1, the flow rate of the slurry in the slicing end portion of the workpiece 2 was changed in the range of 10 to 20 L/min. Further, a state of a slurry curtain at that moment was examined, and shown in Table 1. It is to be noted that Table 1 also shows results of later-described comparative example.

TABLE 1

| | Slurry flow rate in slicing end portion (per nozzle) | | | | |
|---|---|---|---|---|---|
| | 20 L/min | 17.5 L/min | 15 L/min | 12.5 L/min | 10 L/min |
| Example | ○ | ○ | ○ | ○ | ○ |
| Comparative example | ○ | Δ | x | x | x |

○: a state where the curtain is stable without swinging
Δ: a state where the curtain is swinging
x: a state where the curtain is partially disconnected in a longitudinal direction.

In Table 1, the state of the slurry curtain is evaluated in three levels, i.e., a state where the curtain is stable without swinging, a state where it is swinging, and a state where it is partially disconnected in the longitudinal direction.

Consequently, as shown in Table 1, in Example, even if the flow rate of the slurry in the slicing end portion of the workpiece 2 was reduced, the state of the slurry curtain was stable and excellent without swinging. Furthermore, a warp of the sliced wafer provided Example was excellent under all the conditions shown in Table 1.

Comparative Example

A workpiece was sliced like Example except that a conventional wire saw apparatus having no windbreak plate provided to each nozzle was adopted. Moreover, a state of a slurry curtain at that moment was examined and evaluated. Results provided at that moment were shown in Table 1.

Consequently, as shown in Table 1, when a flow rate of the slurry in a slicing end portion of the workpiece was set to 17.5 L/min, the slurry curtain was swinging. Additionally, when the flow rate of the slurry in the slicing end portion of the workpiece was 15 L/min or less, the slurry curtain was partially disconnected in the longitudinal direction under all the conditions. As described above, in Comparative Example, when the flow rate of the slurry in the slicing end portion of the workpiece was reduced, the state of the slurry curtain was not stable in some situations. Thus, in Comparative Example, a warp of the sliced wafer provided by slicing the workpiece under the condition that the flow rate of the slurry in the slicing end portion of the workpiece was 17.5 L/min or less was considerably degraded.

When the slurry curtain is swinging or the slurry curtain is partially disconnected in the longitudinal direction in this manner, since the slurry cannot be uniformly supplied to the wire row, and the warp of the sliced wafer is degraded, which is not preferable.

It is to be noted that the present invention is not restricted to the foregoing embodiment. The foregoing embodiment is an illustrative example, and any example which has substantially the same structure and exerts the same functions and effects as the technical concept described in claims of the present invention is included in the technical scope of the present invention.

The invention claimed is:

1. A wire saw apparatus comprising:
   a wire row formed of a wire that is wound around a plurality of wire guides and reciprocatively travels in an axial direction of the wire; a nozzle from which a coolant or slurry is supplied to the wire; and
   a workpiece feed mechanism that presses a held workpiece against the wire row, the wire saw apparatus being configured to slice the workpiece into a wafer shape by pressing the workpiece held by the workpiece feed mechanism against the wire row and feeding it for slicing while supplying the coolant or the slurry from the nozzle to the wire,
   wherein the nozzle is arranged above the wire row to be orthogonal to the wire row, and windbreak plates are arranged on both left and right sides of the arranged nozzle seen from an axial direction of the nozzle,
   each windbreak plate is arranged in such a manner that a distance between a lower surface of the windbreak plate and the wire row is 1 mm or more and 10 mm or less,
   the nozzle comprises an opening through which the coolant or slurry is supplied to the wire, wherein the opening of the nozzle faces the wire of the wire row, which causes the coolant or the slurry to flow downward from the nozzle to the wire, and
   wherein the lower surface of the windbreak plate is closer to the wire than the opening of the nozzle.

2. The wire saw apparatus according to claim 1, wherein each windbreak plate is arranged in such a manner that a distance from a center of a slit provided in a lower surface of the nozzle to the each windbreak plate is 5 mm or more and 40 mm or less.

* * * * *